United States Patent [19]

Boeglin et al.

[11] 4,333,381

[45] Jun. 8, 1982

[54] PLATE-GLASS FITTED WITH AN EXPLOSION-CUTTING DEVICE

[75] Inventors: Paul H. Boeglin, Maule; Claude R. Chigot, Saint-Nazaire, both of France

[73] Assignee: Societe Nationale Industrielle Aerospatiale, Paris, France

[21] Appl. No.: 107,605

[22] Filed: Dec. 27, 1979

[30] Foreign Application Priority Data

Jan. 4, 1979 [FR] France .................................. 79 00192

[51] Int. Cl.³ .............................................. B64C 1/32
[52] U.S. Cl. ........................................ 89/1 B; 49/141; 244/122 AF
[58] Field of Search ................... 89/1 B; 102/49.5; 244/122 AF, 122 AE, 121; 49/141

[56] References Cited

U.S. PATENT DOCUMENTS

| | | | |
|---|---|---|---|
| 3,135,163 | 6/1964 | Mechlin et al. | 89/1.817 X |
| 3,185,090 | 5/1965 | Weber | 102/49.5 X |
| 3,196,791 | 7/1965 | Francis et al. | 89/1 B X |
| 3,323,544 | 6/1967 | Francis | 102/24 HC X |
| 3,729,154 | 4/1973 | Deplante | 244/122 AF |
| 3,782,284 | 1/1974 | Gibb et al. | 244/121 X |
| 3,806,069 | 4/1974 | Galton | 244/122 AF |

*Primary Examiner*—David H. Brown

[57] ABSTRACT

The window is constituted by two parallel walls and a central space, a detonating fuse being inserted between the walls and mounted in such a manner as to produce anisotropic detonating action. As a result of detonation, breakage and ejection of the outer wall and embrittlement of the inner wall take place simultaneously along the cutting outline.

5 Claims, 2 Drawing Figures

PLATE-GLASS FITTED WITH AN EXPLOSION-CUTTING DEVICE

The present invention relates to a plate-glass window fitted with an explosion-cutting device.

In more exact terms, the present invention has for its object a plate-glass window, in particular for aircraft, said window being fitted with an explosion-cutting device for providing an instantaneous emergency exit from the flight deck of the aircraft by cutting a plate-glass window by means of said explosion-cutting device.

Solutions to this problem have already been provided by known devices for breaking plate-glass window-panes, especially in aircraft.

There can be mentioned in particular the device described and claimed in French Pat. No. 2,305,341 relating to a device for fracturing a panel. In this invention, fracture of the glass panel is obtained by means of an electric conductor embedded in the mass of the conductive panel to which electric power of sufficiently high value is applied in order to melt the conductor or conductors, thus causing breakage of the glass panel.

There can also be mentioned U.S. Pat. No. 3,885,761 relating to a system for the construction of an emergency exit in an aircraft. In this invention, fracture of the plate-glass window is obtained by means of a detonating fuse placed on one face of the window-pane. A reflecting system ensures that the entire quantity of energy released is in fact directed towards the window-pane in order to obtain the desired rupture.

Another invention which is worthy of note is described in French Pat. No. 2,121,843 relating to a crew evacuation system. In this system, breakage of the window-pane is obtained by means of a detonating fuse which is applied against one face of the pane. More specifically, the cited invention relates to an assembly of supporting or retaining plates which make it possible, without involving the use of any adhesive agent, to maintain the detonating fuse against the transparent material of the window-pane by exerting on said fuse a predetermined pressure per unit length of fuse, this result being achieved independently of temperature variations.

These three designs of the prior art are each attended by disadvantages. In the case of the first device, an electric power supply has to be provided in order to cause melting of the conductors. Furthermore, it is practically necessary to ensure that these conductors are embedded in the glass mass which constitutes the panel. This complicates the construction of the panel and limits the range of panel materials open to choice.

In the case of the other two devices which make use of a detonating fuse, the fuse is applied against one face of the window. In consequence, explosion of the fuse causes fragmentation of the window-pane, with the result that potentially dangerous pieces of broken glass are liable to fall into the interior of the flight deck.

This invention is precisely directed to a plate-glass panel (designated hereinafter as a window) which is fitted with an explosion-cutting device and makes it possible to overcome the disadvantages mentioned in the foregoing.

To this end, the invention is distinguished by the fact that said window is constituted by two respectively inner and outer parallel walls between which is maintained an empty space, and that said device consists of means inserted between said walls for producing a detonation and mounted in such a manner as to produce anisotropic detonating action. Thus said detonation gives rise simultaneously along the cutting outline on the one hand to breakage and ejection of said outer wall and on the other hand to embrittlement of said inner wall.

A first aim of the invention is to provide a window which is fitted with said explosion-cutting device and makes it possible to obtain sufficient embrittlement of the glass pane along a well-determined outline in order to permit easy subsequent fracture of said pane while preventing any introduction of window-glass fragments into the interior of the aircraft.

Another aim of the invention is to provide a window fitted with said device, said window being constituted by a thin inner wall and by a thick outer wall, the explosion-cutting detonating fuse being inserted between said walls. The forward effect of the detonating fuse is utilized in order to cause breakage of the thick outer pane and the rearward effect of detonation of the fuse is utilized for embrittlement of the inner pane while maintaining the latter in position.

A further aim of the invention is to provide a window fitted with a breaking device of the type hereinabove defined in which the thin inner wall comprises at least one transparent sheet of plastic material which ensures that the inner wall is held in position after fracture of the glass portion of said inner wall has taken place.

A more complete understanding of the invention will in any case be gained from the following description of one embodiment of the invention which is given by way of example without any limitation being implied, reference being made to the accompanying drawings in which.

Before proceeding to a more detailed description of a preferred embodiment, it is important to define the principle of the invention in order to show its original character with greater clarity. In devices of the prior art which make use of detonating fuses, the latter are applied against one wall of the pane and special arrangements are made to concentrate the energy released by detonation of the fuse in the direction of the glass pane. If the fuse employed has a V-shaped cross-section and is thus equivalent to a hollow charge, it is a desirable objective to amplify the forward effect of detonation of the fuse and to absorb the rearward effect. On the contrary, and in accordance with the invention, the detonating fuse is interposed between the two walls constituting the plate-glass window. Thus the "forward effect" is utilized both for breaking and ejecting the thick outer wall and the "rearward effect" is utilized for embrittling the thin inner wall without producing dislocation of this latter. This embrittlement is sufficient to require only a very limited effort in order to obtain opening of the emergency exit thus made available.

Figure 1:
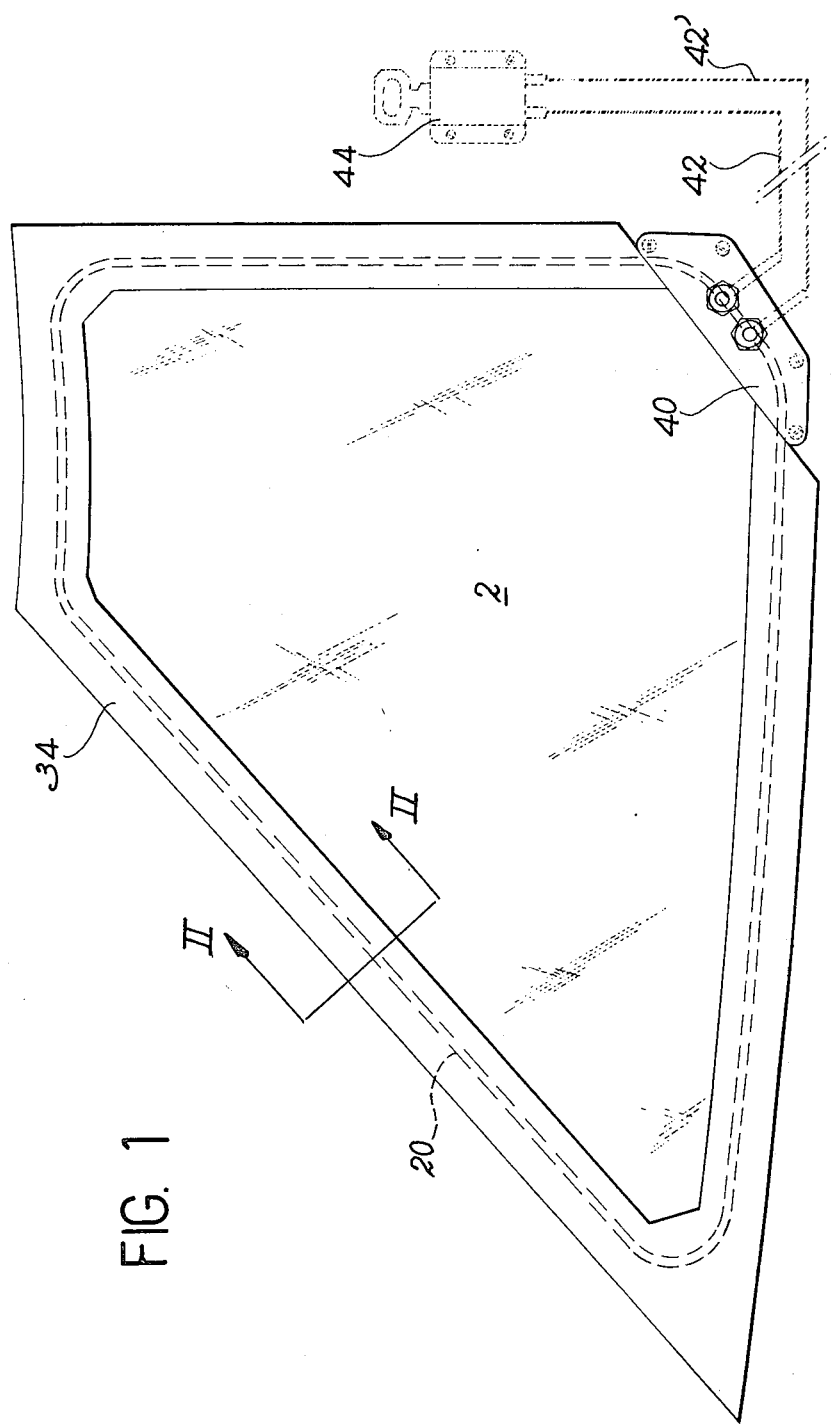
FIG. 1 is a view in elevation of a side plate-glass window of an aircraft, said window being shown in the disassembled state and fitted with the cutting system according to the invention.

In FIG. 1, there is shown a side window of the flight deck of an aircraft, the window being shown prior to assembly within its frame.

Figure 2:
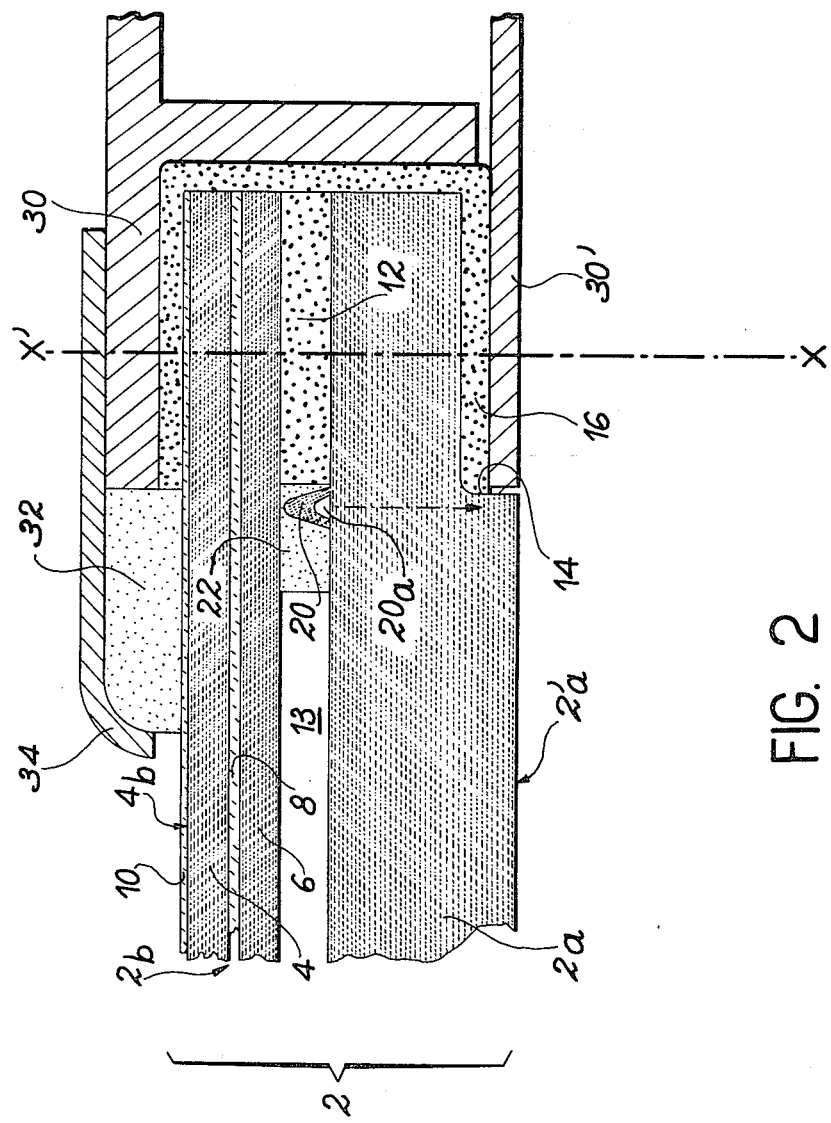
FIG. 2 is a fragmentary sectional view taken along plane II—II of FIG. 1 and showing both the position-location of the detonating fuse and the structure of the double-walled window pane.

As shown more clearly in FIG. 2, the plate-glass window which is designated by the general reference 2 is in fact constituted by an outer wall 2a and by an inner wall 2b. The outer wall 2a is of substantial thickness. By way of example, said thickness can have a value of 16 mm and the window can be fabricated from Oroglass (trademark of a material of the transparent acrylic-resin type).

The inner wall 2b is of smaller thickness. In a preferred embodiment, said wall 2b is constituted by two plates 4 and 6 of Oroglass assembled together and bonded with an intermediate sheet 8 of butyral. A further possibility consists in bonding a film 10 of polyurethane to that face 4b of the plate 4 which is directed towards the interior of the aircraft cabin or flight deck. For example, the plates 4 and 6 have a thickness of 3.17 mm, the sheet 8 has a thickness of 1 m and the sheet 10 has a thickness of 0.5 mm.

The foregoing clearly constitutes only one example of fabrication of the inner plate-glass wall 2b. It may be stated in more general terms that the plate-glass window consists of a laminated product, the internal window face being covered with a thin sheet of plastic material.

Between the wall 2a and the wall 2b, there is placed a spacer element 12 which extends around the entire periphery of the window 2 along the edge of this latter and thus forms a space 13 between the two walls. The two walls are attached to the spacer element 12 by bonding with an adhesive product in accordance with well-known practice.

By way of example, the spacer element 12 has a thickness of 4 mm and is formed of material known by the trademark "Dacron". Moreover, the outer face 2'a of the outer wall has a portion 14 of reduced thickness in the proximity of its edge in order to facilitate mounting of the window-pane within the frame. A seal 16 obtained by molding covers that portion of the assembly which is engaged within the frame.

The detonating cutting-fuse 20 is housed within the space 13 in the vicinity of the spacer element 12 so that said fuse 20 accordingly defines the outline of the portion to be cut-out. Preferably, the detonating fuse 20 has a cross-section in the shape of a V in which the hollow portion 20a is directed towards the thick wall 2a. By way of example, the detonating fuse can be formed in a continuous manner by a lead sheath containing a powdered explosive such as hexogen. The fuse permits a cutting rate of the order of 7000 m/s. The detonating fuse 20 is embedded in a packing 22 of silicone-base material which is polymerizable in contact with air.

The complete plate-glass window 2 is mounted within the window frame.

FIG. 2 shows an upright 30 and a seal coverplate 30' between which the window 2 is fixed by clamping means not shown in the figure but disposed along the axis X—X' of FIG. 2.

This assembly is completed by a packing 32 which surrounds the window and is formed on the layer 10, said packing being placed in abutting relation to the upright 30. In other words, said packing 32 is formed on that face of the window 2 which is directed towards the interior of the aircraft cabin. Furthermore, a splinter-proof shield 34 is fixed on the upright 30 and limits the packing 32. This latter is of the same nature as the packing 22 in which the detonating fuse 20 is embedded.

It is important to note that the splinter-proof shield 34 and the packing 32 extend beyond the upright 30 and in particular that they accordingly cover that portion of the inner wall 2b which is located in oppositely-facing relation to the rear end of the detonating fuse 20. At the time of detonation of the fuse, this assembly partially damps the rupture effect and performs a contributory function in supporting the embrittled wall 2b.

As can readily be understood, said plate-glass window is associated with a unit for igniting the detonating fuse 20. Said unit is constituted by a double initiation element 40 which is mounted by screwing onto the window frame, this latter being clearly connected to the detonating fuse 20. Said initiation element 40 is connected by means of two transmission fuses 42 and 42' to an ignition control box 44 which can be operated by hand. Said control box is preferably equipped with the safety devices which are necessary for preventing accidental operation. Provision is made for two spring-acting striker-pins and for two percussion caps.

The operation of the installation with a view to obtaining an emergency exit in the plate-glass window is already clear from the foregoing description and will therefore be explained only in brief outline.

When action is produced on the control box 44, detonation of the fuse 20 is obtained by successive initiations of the percussion caps, of the transmission chains and of the initiators. The forward effect described earlier results in instantaneous breakage of the outer wall 2a and ejection of this latter. The rearward effect (which is partially absorbed as already mentioned) causes extreme embrittlement of the two plates which constitute the inner wall 2b. However, the laminated structure of the inner wall 2b and in particular the polyurethane layer 10 and the butyral layer 8 prevent glass fragments from falling into the aircraft cabin. In order to free the emergency exit, it is only necessary to exert an outward thrust on the wall 2b which has already been embrittled. Furthermore, the internal splinter-proof shield covers those fragments of window which may remain trapped within the window upright.

In conclusion, it is apparent that the window equipped with its explosion-cutting device performs all the necessary functions while ensuring maximum safety and ease of both operation and utilization of the emergency exit thus provided.

We claim:

1. A plate-glass window fitted with an explosion-cutting device for obtaining an emergency exit by cutting said window along a well-determined outline, wherein said plate-glass window is constituted by two respectively inner and outer parallel walls between which is maintained an empty space and wherein said device comprises a detonating and cutting fuse, inserted along said outline between said walls and mounted with damping means, so that the detonation of said fuse produces an anisotropic detonating action, said fuse being orientated in order that said detonating action is applied on said outer wall so that operation of said fuse gives rise simultaneously along the cutting outline on the one hand to breakage and ejection of said outer wall and on the other hand to embrittlement of said inner wall upon detonation.

2. A plate-glass window according to claim 1, wherein said means consist of a detonating and cutting fuse disposed along said outline, a front face of said detonating fuse being such as to form a hollow charge in contact with the outer wall and a rear face of said fuse being located in the vicinity of the inner wall, and of damping means disposed on the inner wall opposite to said detonating fuse.

3. A plate-glass window according to claim 2, wherein said detonating fuse is embedded in a silicone-base packing.

4. A plate-glass window according to claim 2, wherein said inner wall is a laminated sheet.

5. A plate-glass window according to claim 4, wherein said laminated sheet is covered with a polyurethane sheet on the inwardly-directed face.

* * * * *